Aug. 21, 1951     R. G. LE TOURNEAU     2,565,247
SCRAPER BOWL STRUCTURE
Original Filed April 27, 1946     3 Sheets-Sheet 1
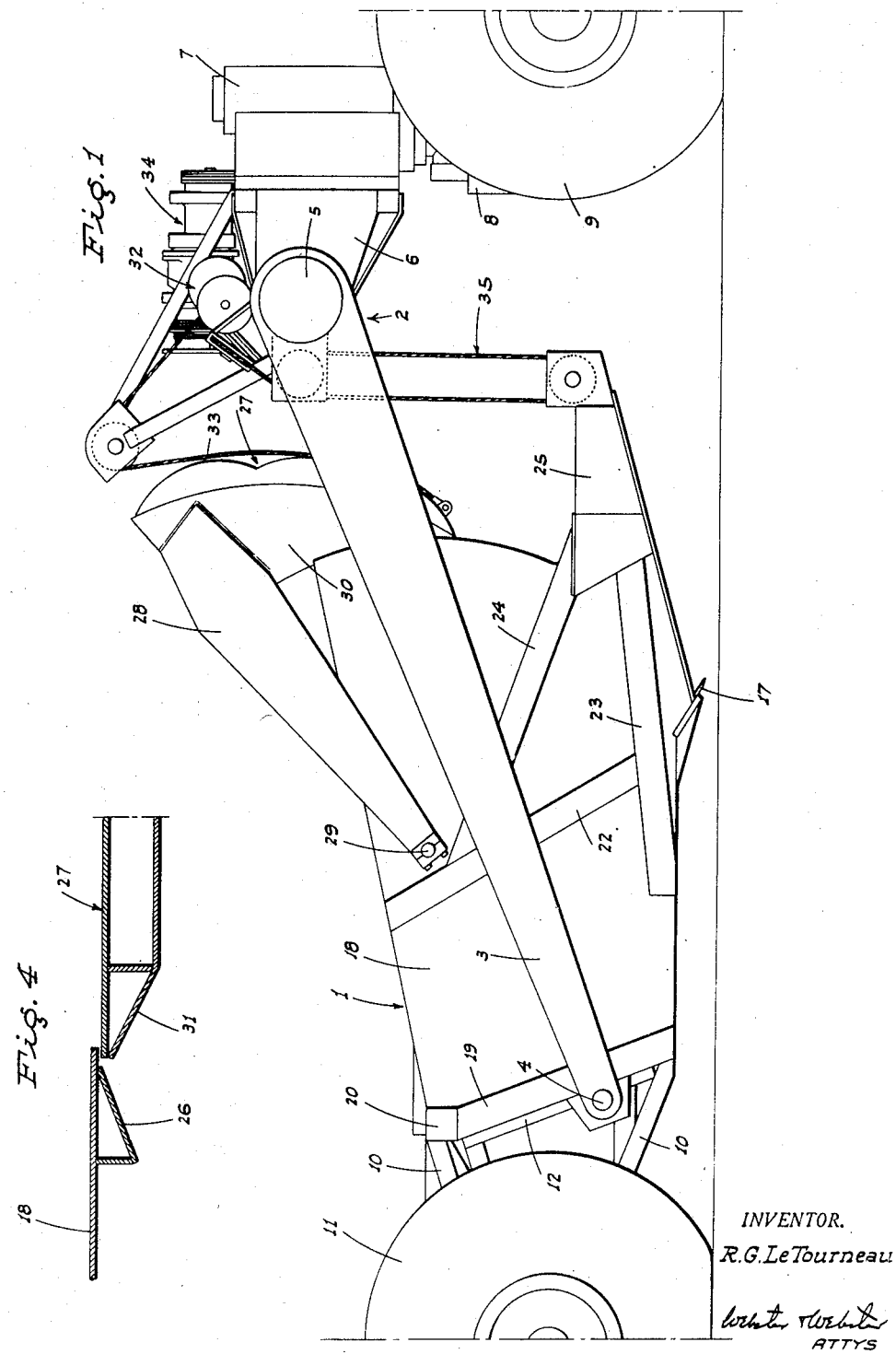
INVENTOR.
R.G.LeTourneau
ATTYS

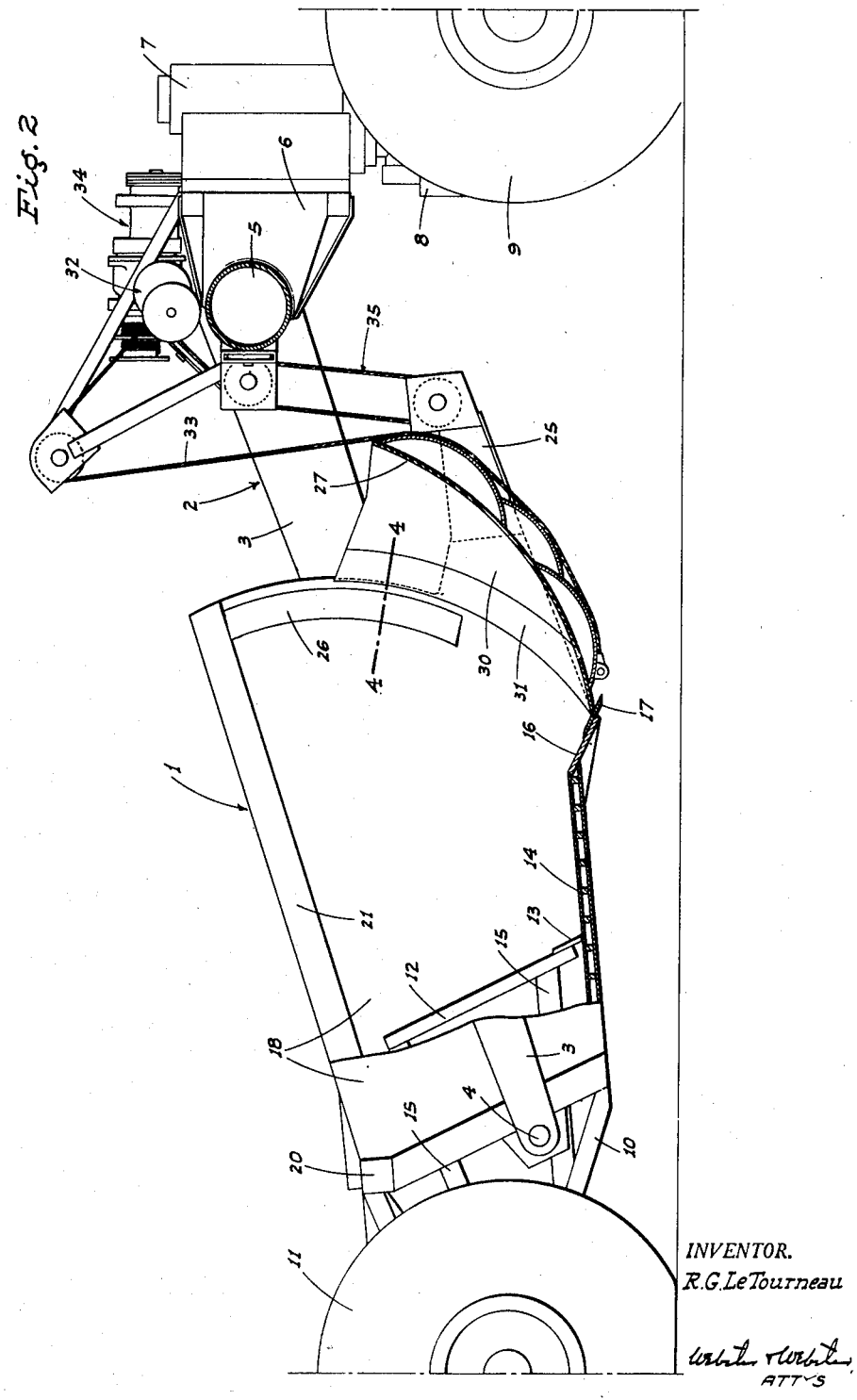

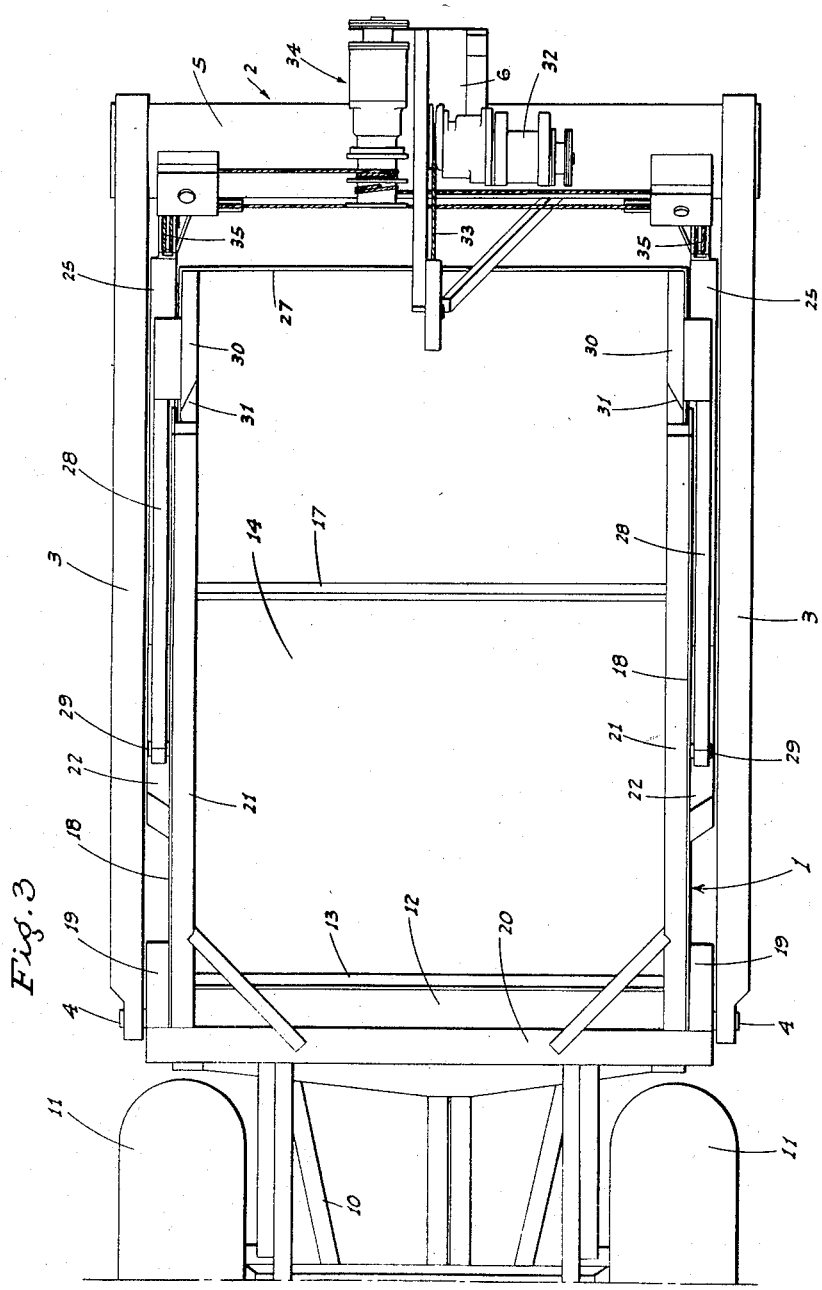

Patented Aug. 21, 1951

2,565,247

UNITED STATES PATENT OFFICE 2,565,247

SCRAPER BOWL STRUCTURE

Robert G. Le Tourneau, Longview, Tex., assignor to R. G. Le Tourneau, Inc., Stockton, Calif., a corporation of California Original application April 27, 1946, Serial No. 665,578. Divided and this application December 4, 1947, Serial No. 789,733

4 Claims. (Cl. 37—126)

This invention relates to, and it is an object to provide, an improved earth working scraper of the type which is operative to dig, carry, unload, and spread earth.

This application is a division of copending application, Serial No. 665,578, filed April 27, 1946, now Patent No. 2,495,336 of January 24, 1950, on Earth Working Scraper.

Another object of the invention is to provide a scraper which includes an earth carrying bowl of novel construction; such bowl being simplified and of relatively light weight, but of substantial strength and durability.

An additional object of the invention is to provide a novel stiffening frame structure as reinforcing means for the side walls or plates of the bowl.

It is also an object of the invention to provide a scraper bowl constructed in a manner such that the side walls or plates can be unconnected above the bowl bottom from their forward ends to adjacent their rear ends.

In the drawings:

Fig. 1 is a side elevation of the scraper, with the bowl in unloading position and the front apron raised.

Fig. 2 is a side elevation, mainly in section, showing the bowl in transport position, and the front apron closed.

Fig. 3 is a plan view of the scraper.

Fig. 4 is an enlarged fragmentary cross section on line 4—4 of Fig. 2.

Referring now more particularly to the characters of reference on the drawings, the scraper comprises a bowl, indicated generally at 1, straddled from the front by means of a heavy-duty draft yoke, indicated generally at 2. The draft yoke includes transversely spaced, rearwardly and downwardly inclined side beams 3 pivotally connected, at their rear ends, to the corresponding end of the bowl 1, adjacent the bottom of the latter, as at 4. At their forward ends, and ahead of the bowl, the side beams 3 are rigidly connected together by a heavy-duty tubular cross beam 5. Centrally of its ends the cross beam 5 is formed with a rigid, forwardly projecting attachment neck 6 which is coupled in rigid relation to a power steering unit 7 mounted on and upstanding from the deck 8 of a tractor at the rear end of the latter; the tractor being of two-wheel type, with the wheels shown at 9.

At its rear end the scraper bowl 1 is formed with a rigid, rearwardly projecting, open frame structure 10, which supports a pair of transversely spaced rear wheels 11. The pairs of wheels 9 and 11 are of relatively large diameter and are provided with pneumatic tires.

The bowl is provided, within the same, with a longitudinally movable rear end, or earth push-out, gate 12 which includes a blade or sweep 13 which rides on the bottom 14 of said bowl. The rear endgate 12 is formed on the back thereof with a push bar assembly or frame 15 power actuated, to advance or retact said rear endgate, by power mechanism supported within the frame structure 10, but not here shown.

The bottom 14 of the bowl is of reinforced construction and at its forward edge is formed with a blade base 16, on which a transverse cutting or digging blade 17 is attached.

The bowl 1 includes metal side plates 18 which are secured in connection with, and upstand from, opposite sides of the bottom 14 of said bowl. Each side plate 18 is formed in unitary relation with a stiffening frame structure which comprises the following:

At the rear end and outside theerof each side plate is secured to an upstanding post 19; said posts being connected, at their upper ends, by a top back beam 20. A top side beam 21 is fixed on each side plate 18 on the inside and extends along the upper edge of said plate.

An upstanding intermediate post 22 is affixed to each side plate 18 on the outside thereof, and stiffening beams 23 and 24 similarly affixed to the outside of each side plate extend forwardly from the intermediate post 22, to which they are also connected. Each stiffening beam 23 is disposed longitudinally adjacent the bottom of the bowl, whereas the stiffening beam 24 extends diagonally at a downward and forward slope from the intermediate post 22. The pair of stiffening beams 23 and 24 on each side of the bowl project forwardly ahead of the latter, and form a part of forwardly projecting bowl lifting arms 25 on opposite sides of said bowl.

At their forward ends the side plates 18 are convex, as shown, and said plates include, adjacent said forward ends and on the inside thereof, arcuate reinforcing or stiffening ribs 26, said ribs being connected to and extending downward from the top side beams 21 a substantial distance; i. e. to approximately the point of intersection with the corresponding diagonal stiffening beams 24. The ribs 26 are of such cross sectional configuration, as shown in Fig. 4, that they feather forwardly relative to the corresponding side plates.

By reason of the above described construction of the bowl 1, it is simplified and of relatively light weight but is strong and durable. Additionally, the stiffening frame structure, as employed in connection with each of the side plates 18, makes possible the elimination of the conventional arch or A-frame which connects opposite side plates of scraper bowls at the forward ends of the latter.

The sides plates of the bowl in the present scraper are unconnected above the bottom of the bowl from their forward ends to adjacent their rear ends. This simplifies construction, reduces weight, and improves the operator's vision of the load.

The scraper includes, in cooperation with the initially open, forward end of the bowl 1, a vertically swingable apron 27 which includes side arms 28 at opposite ends thereof; said side arms extending rearwardly alongside the bowl to pivotal connection at their rear ends with the side plates 18 adjacent the upper edges thereof, as at 29. The apron side arms 28 work or swing in a vertical plane between the side beams 3 of the yoke 2, and adjacent side plates 18 of the bowl.

The apron 27 includes side wings 30 of double-wall construction, as shown in Fig. 4; the rearward end portion of the inner wall of each of said side wings being feathered laterally out, as at 31, to the rear edge of the corresponding outer wall.

The apron 27 is vertically adjustable between a closed, dirt retaining position, as shown in Fig. 2, and a raised open position, as shown in Fig. 1, by means of an electric motor-actuated, power winch mechanism, indicated generally at 32, which includes an adjustable suspension cable 33 connected to said apron.

Raising and lowering of the bowl 1 is accomplished by means of another electric motor-actuated, power winch mechanism, indicated generally at 34, which includes adjustable suspension cables 35 connected to the forward ends of the lifting arms 25.

The mechanisms 32 and 34 are supported by the cross beam 5.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A scraper bowl comprising a rigid bottom, side plates secured in connection with and upstanding from opposite sides of the bottom, and a stiffening rib formed on each side plate along its forward edge portion on the inside of the bowl and extending downwardly from adjacent the upper edge of said side plate to a termination some distance above the bottom; said ribs being of a cross sectional configuration such that the same feather forwardly relative to the corresponding side plates and each having a lateral back face substantially at right angles to the side plates.

2. A scraper bowl comprising a rigid bottom, side plates secured in connection with and upstanding from opposite sides of the bottom, upstanding posts secured to the side plates adjacent their rear ends, means rigidly connecting the posts, longitudinal top beams secured on the side plates along the upper edges thereof on the inside, intermediate upstanding posts secured on the side plates on the outside, stiffening beams secured on the side plates on the outside and extending forwardly from the intermediate posts, one stiffening beam on each side plate extending to its forward edge some distance below the upper edge thereof, and stiffening ribs formed on each side plate along its forward edge portion on the inside and extending downwardly from said upper edge to a point adjacent its intersection with said one stiffening beam.

3. A scraper bowl comprising a rigid bottom, side plates secured to and upstanding from opposite sides of the bottom, such side plates being unconnected above the bottom from their forward ends to adjacent their rear ends, and a stiffening frame structure affixed to each side plate, such frame structure comprising upstanding posts at the rear ends of said side plates, a back beam connecting the posts at their upper ends, an inside beam fixed to the inside of each side plate along the top edge thereof, an upstanding post fixed to the outside of each side plate intermediate its ends, an outside beam fixed to each of said last named posts and to the adjacent side plate near its lower edge, a second outside beam fixed to each of the last named posts intermediate its ends and to the adjacent side plate and angling downwardly and forwardly toward the first named outside beam, and a stiffening rib fixed to the inside of each side plate adjacent its forward edge and extending to a point of intersection with the corresponding second named outside beam.

4. A scraper bowl structure as in claim 3 in which the outside beams project forwardly of the front ends of the side plates, and lifting arms fixed rigidly to the forward ends of said outside beams.

ROBERT G. LE TOURNEAU.

REFERENCES CITED

The following references are of record in the file of this patent:

UNITED STATES PATENTS

| Number | Name | Date |
|---|---|---|
| 2,101,400 | Lawler | Dec. 7, 1937 |
| 2,252,763 | French | Aug. 19, 1941 |
| 2,262,310 | Wooldridge | Nov. 11, 1941 |
| 2,380,285 | Austin | July 10, 1945 |
| 2,394,428 | Cox | Feb. 5, 1946 |